US008316335B2

(12) United States Patent
Barowski et al.

(10) Patent No.: US 8,316,335 B2
(45) Date of Patent: Nov. 20, 2012

(54) MULTISTAGE, HYBRID SYNTHESIS PROCESSING FACILITATING INTEGRATED CIRCUIT LAYOUT

(75) Inventors: Harry Barowski, Boeblingen (DE); Harold Mielich, Stuttgart (DE); Friedrich Schroeder, Stuttgart (DE); Alexander Woerner, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 155 days.

(21) Appl. No.: 12/963,677

(22) Filed: Dec. 9, 2010

(65) Prior Publication Data
US 2012/0151429 A1 Jun. 14, 2012

(51) Int. Cl.
*G06F 17/50* (2006.01)
(52) U.S. Cl. ........................ 716/119; 716/104
(58) Field of Classification Search .................. 716/104, 716/119
See application file for complete search history.

(56) References Cited

U.S. PATENT DOCUMENTS

| | | | |
|---|---|---|---|
| 5,530,654 A | 6/1996 | Takahashi | |
| 6,295,628 B1 | 9/2001 | Nakamura | |
| 6,301,692 B1 * | 10/2001 | Kumashiro et al. | 716/119 |
| 6,385,761 B1 * | 5/2002 | Breid | 716/104 |
| 6,519,742 B1 * | 2/2003 | Falk | 716/103 |
| 6,536,028 B1 * | 3/2003 | Katsioulas et al. | 716/125 |
| 6,732,350 B1 * | 5/2004 | Falk | 716/103 |
| 7,143,367 B2 | 11/2006 | Eng | |
| 7,269,815 B2 | 9/2007 | Wein et al. | |
| 7,337,100 B1 * | 2/2008 | Hutton et al. | 703/13 |
| 7,992,123 B2 * | 8/2011 | Hsin | 716/132 |
| 2001/0027553 A1 * | 10/2001 | Tanaka et al. | 716/2 |
| 2004/0088674 A1 * | 5/2004 | Kato et al. | 716/18 |
| 2006/0242616 A1 * | 10/2006 | Iotov | 716/17 |
| 2008/0295055 A1 * | 11/2008 | Sadakane et al. | 716/12 |

(Continued)

FOREIGN PATENT DOCUMENTS
JP 07-021994 A 9/1995

OTHER PUBLICATIONS

Krupnova et al., "Synthesis and Floorplanning for Large Hierarchical FPGAs", Institut Nationional Polytechnique de Genoble, CSI, pp. 105-111 (1997).

(Continued)

*Primary Examiner* — Stacy Whitmore
*Assistant Examiner* — Magid Dimyan
(74) *Attorney, Agent, or Firm* — Dennis Jung, Esq.; Kevin P. Radigan, Esq.; Heslin Rothenberg Farley & Mesiti P.C.

(57) ABSTRACT

Multistage synthesis of hardware function operation descriptions is provided, which facilitates placement of logic cells in an integrated circuit design layout, and includes: parsing hardware function operation descriptions of a circuit to identify multiple instantiations of a type of logic function; performing, without shape restriction, a first synthesis on each logic function type identified as having multiple instantiations and producing an irregular-shaped logic unit layout for that logic function type; establishing an irregular-shaped blocking mask corresponding to a respective irregular-shaped logic unit layout produced by the first synthesis; creating a partial circuit layout by placing each irregular-shaped blocking mask multiple times corresponding to the multiple instantiations of the respective logic function type; and performing, employing the partial circuit layout, a second synthesis on the balance of the hardware function operation descriptions of the circuit outside the multiple instantiations of the logic function type.

20 Claims, 10 Drawing Sheets

U.S. PATENT DOCUMENTS

2009/0271752 A1 10/2009 Alpert et al.
2010/0218146 A1* 8/2010 Platzker et al. .................. 716/4

OTHER PUBLICATIONS

Gielen, et al., "Performance Space Modeling for Hierarchical Synthesis of Analog Integrated Circuits", Katholieke Universiteit Leuven, ESAT-MICAS, pp. 881-886 (Jun. 2005).

Rutenbar et al., "Hierarchical Modeling, Optimization, and Synthesis for System-Level Analog and RF Designs", Proceedings of the IDDD, vol. 95, No. 3, pp. 640-669 (Mar. 2007).

* cited by examiner

MULTISTAGE, HYBRID SYNTHESIS PROCESSING FACILITATING INTEGRATED CIRCUIT LAYOUT

BACKGROUND

The present invention relates to the design of integrated circuits, and more particularly, to the physical layout (i.e., placement) of logic cells in an integrated circuit design. An integrated circuit is fabricated by conceiving the logical circuit description, and then converting that logical description into a physical description, or geometric layout. This process is usually carried out using a "netlist", which is a record of all the nets (or interconnections) between the cell pins. A layout typically consists of a set of planar geometric shapes in several layers. The layout is then checked to ensure that it meets all of the design requirements, particularly timing requirements. The result is a set of design files known as an intermediate form that describes the layout. The design files are then converted into pattern generator files that are used to produce patterns by an optical or electron beam generator. During fabrication, these patterns are used to pattern a wafer using a sequence of photolithographic steps. The process of converting the specifications of an electrical circuit into a layout is called the physical design.

Cell placement in integrated circuit fabrication involves a determination of where particular cells should optimally (or near optimally) be located on the surface of an integrated circuit device. Due to the large number of components and the details required by the fabrication process for a very large-scale integrated (VLSI) devices, physical design is not practical without the aid of computers. As a result, most phases of physical design extensively use computer-aided design (CAD) tools, and many phases have already been partially or fully automated. Automation of the physical design process has increased the level of integration, reduced turn-around time, and enhanced circuit performance. Several different programming languages have been created for electronic design automation (EDA), including Verilog, VHDL and TDML. A typical EDA system receives one or more high-level behavioral descriptions of the integrated circuit device, and translates this high-level design language description into netlists of various levels of abstraction.

Physical synthesis is prominent in the automated design of integrated circuits, such as high-performance processors and application-specific integrated circuits (ASICs). Physical synthesis is the process of concurrently optimizing placement, timing, power consumption, cross-talk effects and the like in an integrated circuit design. This comprehensive approach helps to eliminate iterations between circuit analysis and place-and-route. Physical synthesis has the ability to repower gates (changing their sizes), insert repeaters (buffers or reverters), clone gates or other combinatorial logic, etc., so that the area of logic in a design remains fluid. However, physical synthesis can take days to complete, and the computational requirements are increasing as designs are ever larger and more gates are needed to be placed.

BRIEF SUMMARY

In one aspect, the shortcomings of the prior art are overcome and additional advantages are provided through the provision of a method of facilitating placement of logic cells in an integrated circuit design layout. The method includes: parsing hardware function operation descriptions of a circuit in hardware description language to identify multiple instantiations of at least one type of logic function, each logic function type of the at least one logic function type to be implemented via a plurality of logic cells; performing, without shape restriction, a first synthesis on each logic function type of the at least one logic function type to produce therefrom an irregular-shaped logic unit layout comprising a plurality of logic cells; establishing at least one irregular-shaped blocking mask, each irregular-shaped blocking mask corresponding to a respective irregular-shaped logic unit layout produced by the first synthesis of each logic function type of the at least one logic function type; creating a partial circuit design layout by placing each irregular-shaped blocking mask multiple times therein corresponding to the multiple instantiations of the respective logic function type of the at least one logic function type; and performing, employing the partial circuit layout, a second synthesis on the balance of the hardware function operation descriptions of the circuit outside of the multiple instantiations of the at least one logic function type to place logic cells in the partial circuit design layout about the irregular-shaped blocking masks, wherein the irregular-shaped blocking masks facilitate producing the integrated circuit design layout.

In another aspect, a computer system for facilitating placement of logic cells in an integrated circuit design layout is provided. The computer system includes a memory, and a processor in communications with the memory. The computer system is configured to perform a method comprising; parsing hardware function operation descriptions of a circuit in hardware description language to identify multiple instantiations of at least one type of logic function, each logic function type of the at least one logic function type to be implemented by a plurality of logic cells; performing, without shape restriction, a first synthesis on each logic function type of the at least one logic function type to produce therefrom an irregular-shaped logic, unit layout comprising a plurality of logic cells; establishing at least one irregular-shaped blocking mask, each irregular-shaped blocking mask corresponding to a respective irregular-shaped logic unit layout produced by the first synthesis of each logic function type of the at least one logic function type; creating a partial circuit layout by placing each irregular-shaped blocking mask multiple times therein corresponding to the multiple instantiations of the respective logic function type of the at least one logic function type; and performing, employing the partial circuit layout, a second synthesis on the balance of the hardware function operation descriptions of the circuit outside of the multiple instantiations of the at least one logic function type to place logic cells in the partial circuit layout about the irregular-shaped blocking mask, wherein the irregular-shaped blocking masks facilitate producing the integrated circuit design layout.

In a further aspect, a computer program product for facilitating placement of logic cells in an integrated circuit design layout is provided. The computer program product includes a non-transitory, computer-readable storage medium readable by a processor and storing executable instructions for execution by the processor for performing a method comprising; parsing hardware function operation descriptions of a circuit in hardware description language to identify multiple instantiations of at least one type of logic function, each logic function type of the at least one logic function type to be implemented via a plurality of logic cells; performing, without shape restriction, a first synthesis on each logic function type of the at least one logic function type to produce therefrom an irregular-shaped logic unit layout comprising a plurality of logic cells; establishing at least one irregular-shaped blocking mask, each irregular-shaped blocking mask corresponding to a respective irregular-shaped logic unit layout produced by the first synthesis of each logic function type of the at least one logic function type; creating a partial circuit design layout by placing each irregular-shaped blocking mask multiple times therein corresponding to the multiple instantiations of the respective logic function type of the at least one logic function type; and performing, employing the partial circuit layout, a second synthesis on the balance of the hardware function operation descriptions of the circuit outside of the multiple instantiations of the at least one logic function type to place logic cells in the partial circuit design layout about the irregular-shaped blocking masks, wherein the irregular-shaped blocking masks facilitate producing the integrated circuit design layout.

Additional features and advantages are realized through the techniques of the present invention. Other embodiments and aspects of the invention are described in detail herein and are considered a part of the claimed invention.

BRIEF DESCRIPTION OF THE SEVERAL VIEWS OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
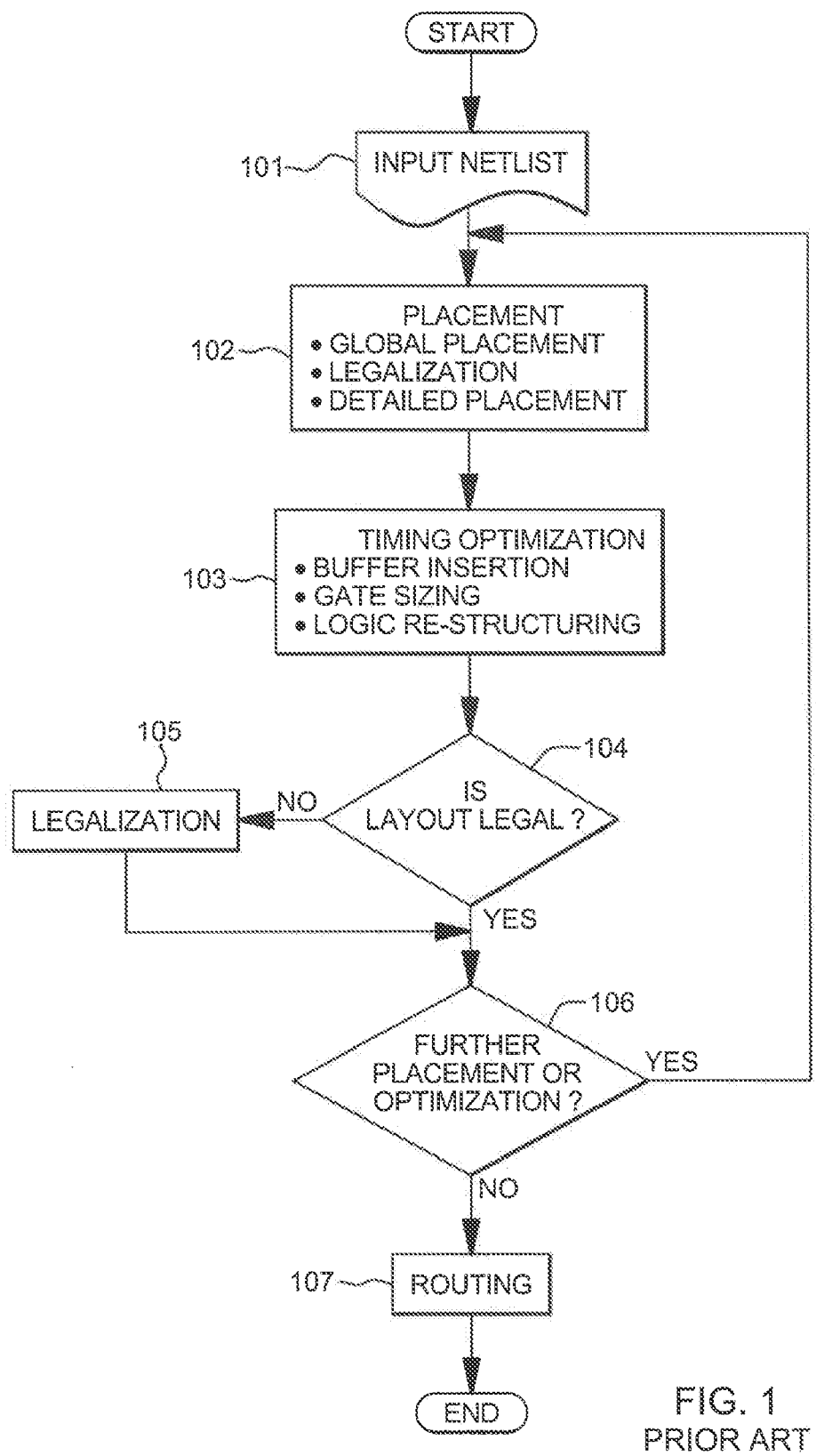
FIG. 1 depicts one embodiment of a physical synthesis process employed in the design of an integrated circuit.

FIG. 1 illustrates a simplified example of conventional physical synthesis. The process begins with an input netlist created by an EDA tool (101). Logic cells in the netlist are placed in the available region of the integrated circuit design using one or more placement tools, for example, a quadratic optimizer based on total wire length (102). The logic cells first undergo global placement during which any non-overlap constraint among the cells is relaxed. The output of global placement accordingly contains overlaps among the cells that need to be resolved. The process of taking a global placement solution and resolving overlaps among the cells to create a "legal" (overlap-free) placement is known as legalization. After legalization, detailed placement is used to further optimize the placement objective by performing local movement of the cells. The legality of the placement is usually preserved during this stage of physical synthesis.

Once an initial placement is obtained, the timing optimization stage performs various transformations, such as buffer insertion, gate sizing, logic re-structuring, etc., to improve the timing characteristics of the design (103). Buffer insertion essentially adds cells to the existing design to introduce known delays. Gate sizing can increase the size of certain cells in the design. In some cases, logic re-structuring transforms can also increase the number of cells in the design. In order to improve their efficiency, these transforms typically do not check for placement legality during the timing optimization stage. All of these transforms can thus potentially cause overlaps among the cells that again need to be resolved, so a check is made to see whether the layout is legal (104) and if not, the legalization algorithm is employed (105). After timing optimization and any legalization, the process may use various constraints or design parameters to determine whether further placement and optimization are desired (106). If so, the process repeats iteravely at the placement step (102). After all placements and optimizations are complete, routing is provided for the circuit (107).

Figure 2:
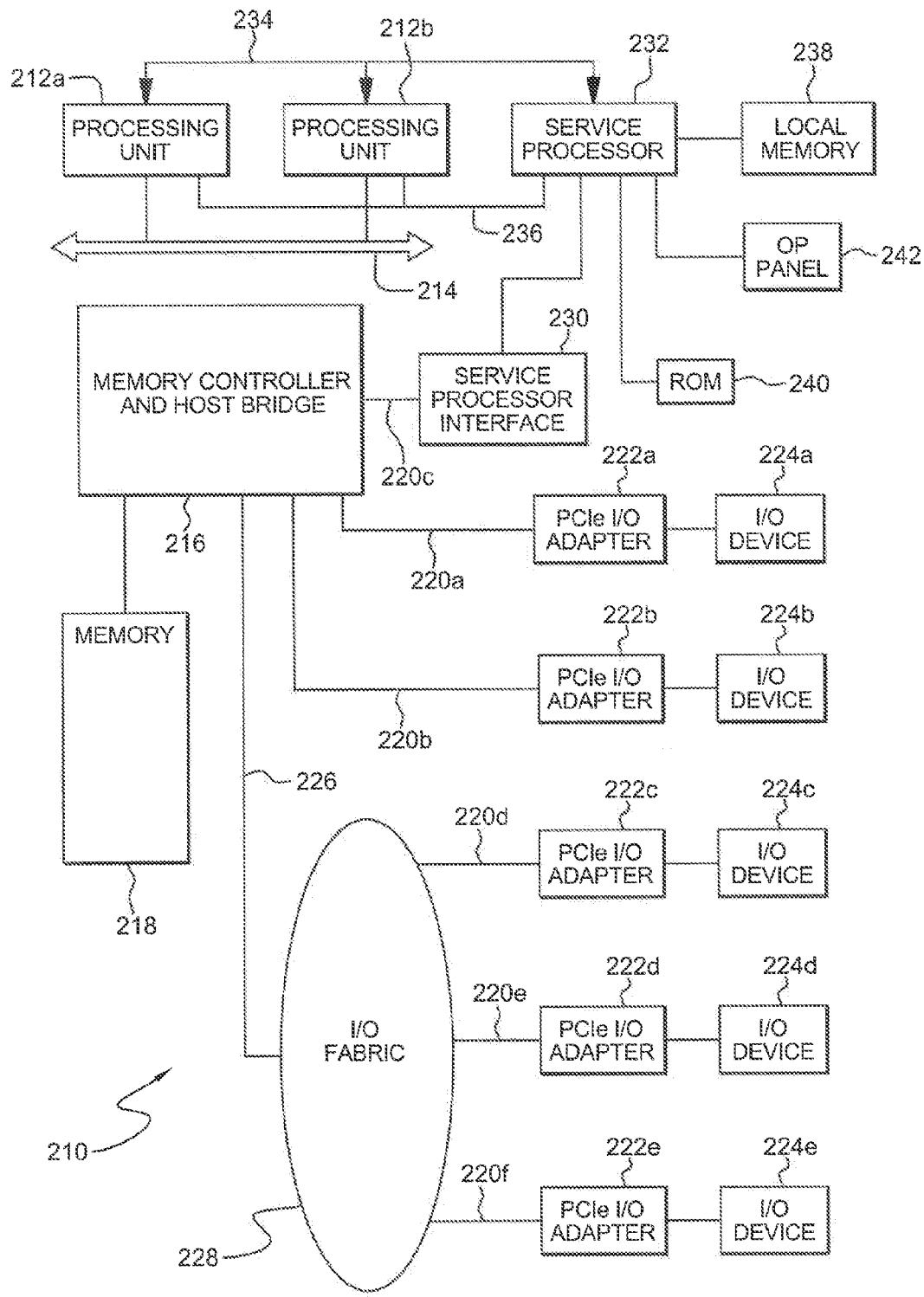
FIG. 2 is a block diagram of one embodiment of a computer system programmed to carry out computer-aided design of an integrated circuit layout, in accordance with an aspect of the present invention.

FIG. 2 depicts one embodiment of a computer system 210 in which aspects of the present invention may be implemented. Computer system 210 is, by way of example, a symmetric multi-processor (SMP) system having a plurality of processors 212a, 212b connected to a system bus 214. System bus 214 is further connected to a combined memory controller/host bridge (MC/HB) 216 which provides an interface to system memory 218. System memory 218 may be a local memory device or alternatively may include a plurality of distributed memory devices, such as dynamic random access memory (DRAM) devices. There may be additional structures in the memory hierarchy which are not depicted, such as on-board (L1) and second-level (L2) or third-level (L3) caches.

MC/HB 216 also has an interface to peripheral component interconnect (PCI) express links 220a, 220b, 220c (for example). Each PCI express (PCIe) link 220a, 220b is connected to a respective PCIe adapter 222a, 222b, and each PCIe adapter 222a, 222b is connected to a respective input/ output (I/O) device 224*a*, 224*b*, MC/HB 216 may additionally have an interface to an I/O bus 226, which is connected to a switch (I/O fabric) 228.

Switch 228 provides a fan-out for the I/O bus to a plurality of PCI links 220*d*, 220*e*, 220*f*. These PCI links are connected to more PCIe adapters 222*c*, 222*d*, 222*e*, which in turn support more I/O devices 224*c*, 224*d*, 224*e*. The I/O devices may include, without limitation, a keyboard, a graphical pointing device (e.g. a mouse), a microphone, a display device, speakers, permanent storage device (e.g., hard disk drive) or an array of such storage devices, an optical disk drive, or a network card, etc. Each PCIe adapter provides an interface between the PCI link and the respective I/O device. MC/HB 216 provides a low-latency path through which processors 212*a*, 212*b* may access PCI devices mapped anywhere within bus memory or I/O address spaces. MC/HB 216 further provides a high-bandwidth path to allow the PCI devices to access memory 218. Switch 228 may provide peer-to-peer communications between different end points, and this data traffic does not need to be forwarded to MC/HB 216 if it does not involve cache-coherent memory transfers. Switch 228 is shown as a separate logic component, but it could be integrated into MC/HB 216.

In the illustrated embodiment, PCI link 220*c* connects MC/FIB 216 to a service processor interface 230 to allow communications between I/O device 224*a* and a service processor 232. Service processor 232 is connected to processors 212*a*, 212*b* via a JTAG interface 234, and uses as an attention line 236, which interrupts the operation of processors 212*a*, 212*b*. Service processor 232 may have its own local memory 238, and is connected to read-only memory (ROM) 240, which stores various program instructions for system start up. Service processor 232 may also have access to a hardware operator panel 242 to provide system status and diagnostic information.

In alternate embodiments, computer system 210 may include one or more modifications to the above-described hardware components or their interconnections, or additional components. The depicted example should not be construed as implying any architectural limitations with respect to the present invention.

When computer system 210 is initially powered up, service processor 232 uses JTAG interface 234 to interrogate the system (host) processors 212*a*, 212*b* and MC/HB 216. After completing the interrogation, service processor 232 acquires an inventory and topology for computer system 210. Service processor 232 then executes various tests, such as built-in-self-test (BISTs), basic assurance tests (BATs), and memory tests on the components of computer system 210. Any error information for failures detected during the testing is reported by service processor 232 to operator panel 242. If a valid configuration of system resources is still possible after taking out any components found to be faulty during the testing, then computer system 210 is allowed to proceed. Executable code is loaded into memory 218 and service processor 232 releases host processors 212*a*, 212*b* for execution of the program code, for example, an operating system (OS) which is used to launch applications, and in particular, the circuit design application of the present invention, the results of which may be stored in the hard disk drive (e.g., I/O device 224). While the illustrative implementation provides program instructions embodying the present invention on the hard disk, those skilled in the art will appreciate that the invention can be embodied in a program product utilizing other computer-readable media. The program instructions may be written using the C++ programming language for an AIX environment. In one embodiment, computer system 210 executes program instructions to carry out placement of logic units and logic cells during the design of an integrated circuit layout using a novel multistage, hybrid synthesis approach, as described further below.

A method, computer system and computer program product are disclosed herein for facilitating placement of logic cells in an integrated circuit design layout by: parsing hardware function operation descriptions of a circuit at a common level in hardware description language to identify multiple instantiations of at least one type of logic function, wherein each logic function type is to be implemented via a plurality of logic cells; performing a first synthesis on each logic function type of the at least one logic function type without regard to the resultant placement shape to produce an irregular-shaped logic unit layout comprising a plurality of logic cells; establishing at least one irregular-shaped blocking mask, each irregular-shaped blocking mask corresponding to a respective irregular-shaped logic unit layout produced by the first synthesis of each logic function type of the at least one logic function type; creating a partial circuit layout by placing each irregular-shaped blocking mask multiple types therein corresponding to the multiple instantiations at the common level of the respective logic function type of the at least one logic function type; and performing, employing the partial circuit layout, a second synthesis on the balance of the hardware function operation descriptions of the circuit outside of the multiple instantiations of the at least one logic function type to place logic cells in the partial circuit layout about the irregular-shaped blocking masks.

Advantageously, the irregular-shaped blocking mask(s) are porous to allow placement of one or more logic cells of the circuit outside of the corresponding logic function within the blocking mask(s) during performing of the second synthesis on the balance of the hardware function operation descriptions of the circuit. Subsequent to the second (final) synthesis on the balance of the hardware function operation descriptions of the circuit outside the multiple instantiations of the at least one logic function type, the irregular-shaped blocking mask(s) are filled in or replaced with the corresponding logic unit(s) to produce a physical circuit layout, upon which (routing and) wiring is performed to produce the integrated circuit design layout, Numerous additional details of this approach are described below with reference to FIGS. 3-6B.

Automated design processing employing physical synthesis is being extended to ever-larger blocks of logic functions. Currently, physical synthesis capabilities are being increased towards unit boundaries. As the complexity of design and the number of logic cells continues to increase, more runtime, more memory and more complex analysis tools are required. Existing synthesis methodology is a flat approach, with identical logic blocks, macros or subunits being flattened. The advantage of this approach is greater flexibility to local design variations, and greater freedom to the design tools. However, a disadvantage is that greater runtime is required because symmetries and duplicates are not recognized.

Figure 3:
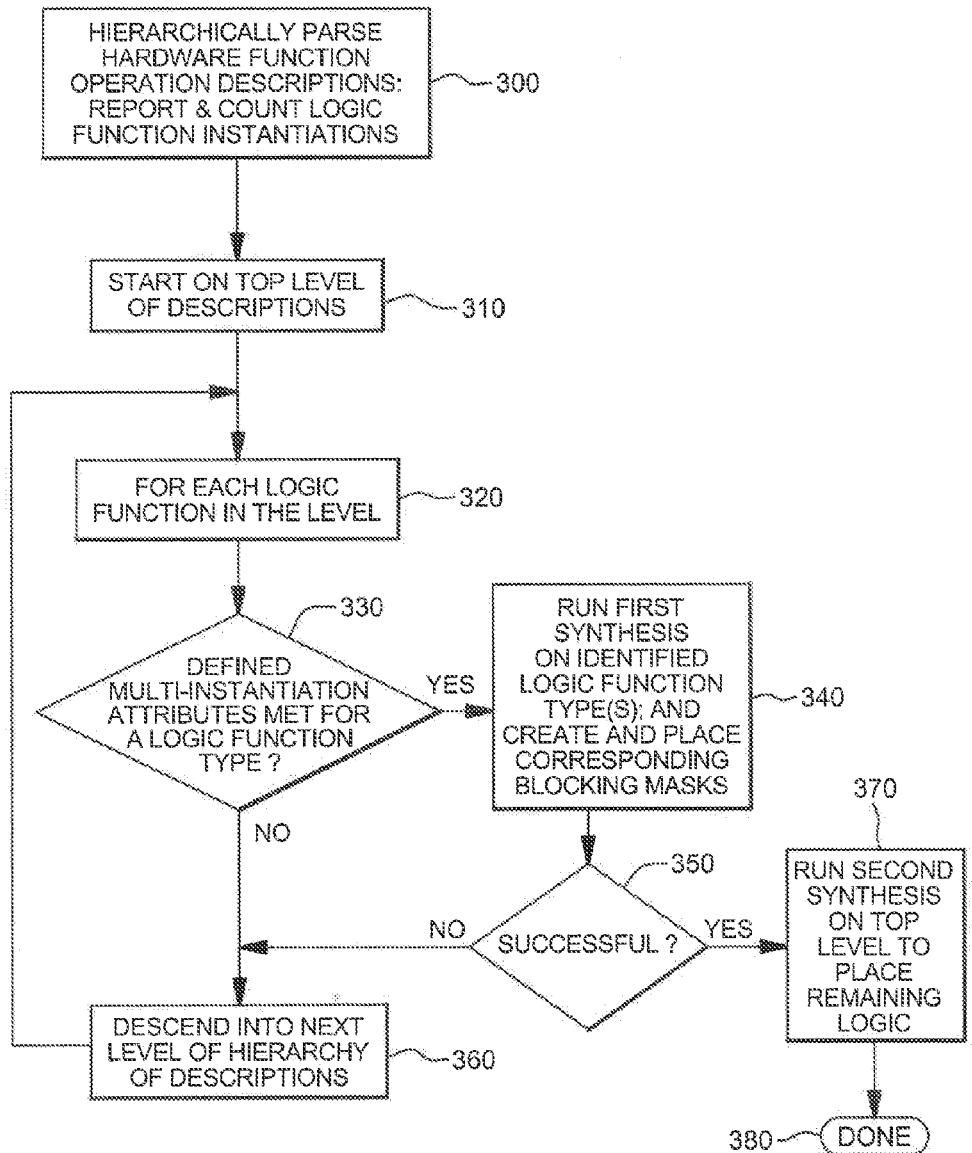
FIG. 3 depicts one embodiment of a multistage, hybrid physical synthesis process, in accordance with an aspect of the present invention.

FIG. 3 depicts one embodiment of a multistage synthesis approach, in accordance with an aspect of the present invention. In this approach, the hardware function operation descriptions are hierarchically parsed and the number of instantiations of each logic function type are counted 300. Processing starts at the top-level description 310 and for each logic circuit function in the current description level 320, determines whether desired attributes for a hybrid synthesis of that logic function type are met 330. One necessary attribute for hybrid synthesis is that there are multiple instances of that type of logic function in the current description level. Other optional attributes include a parameter indicative of whether recursive synthesis is allowed for the logic function type, and a parameter indicative of whether the logic function type corresponds to a known library element, meaning that the unit can be replaced by an existing design rather than implemented by synthesized logic gates. A further optional attribute could be provided to tell the process in advance which logic blocks to work on or not work on. For example, if this attribute (labeled "DENDRITE" in the example below) is false, then processing is prevented from continuing with the multistage, hybrid synthesis approach described herein for that logic function.

Figure 4:
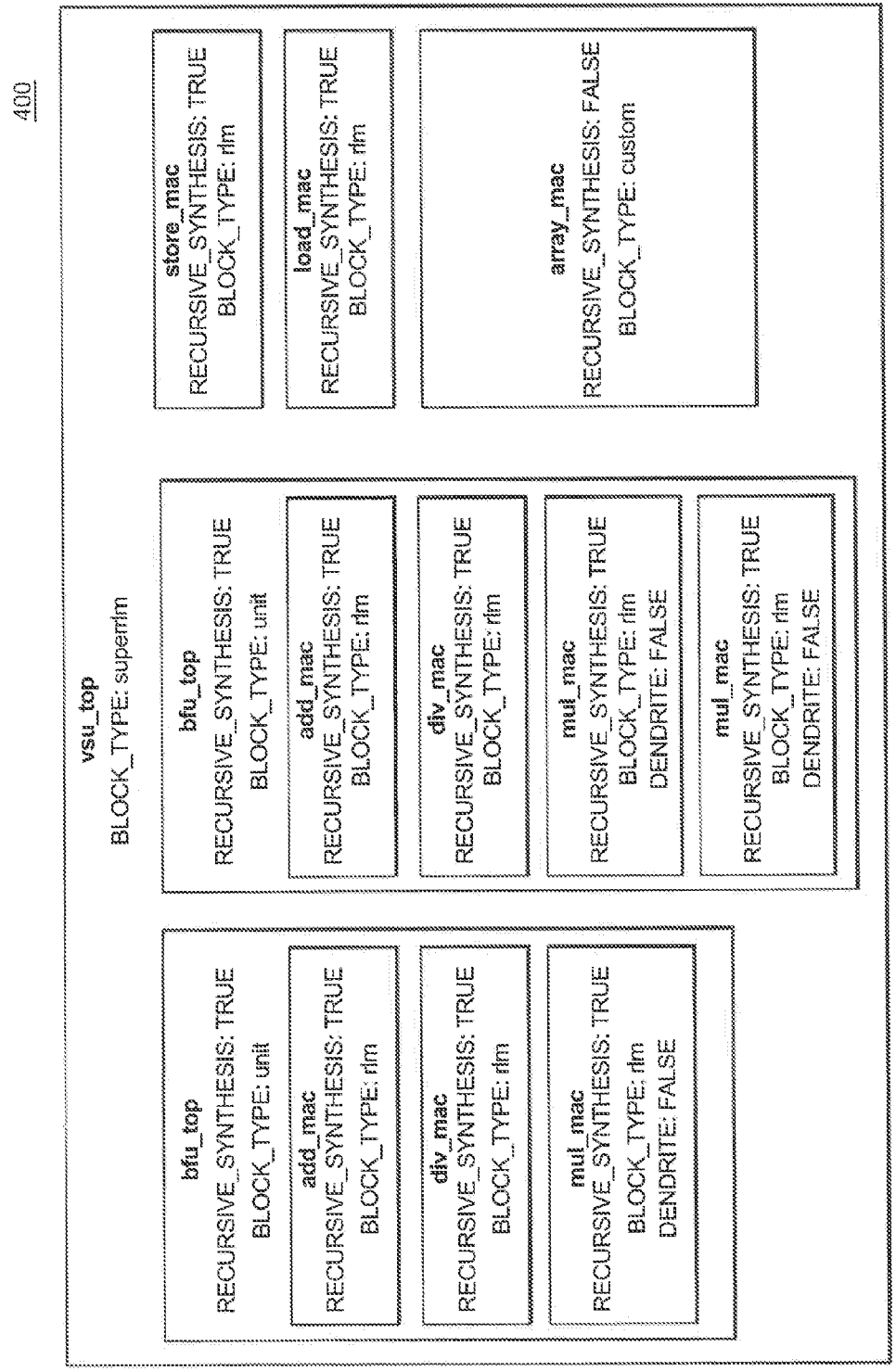
FIG. 4 depicts one embodiment of hierarchical hardware function operations of a circuit to be parsed in hardware description language, in accordance with an aspect of the present invention.

By way of example, FIG. 4 depicts various logic functions, labeled bfu_top, store_mac, load_mac and array_mac in a top-level hierarchy (labeled vsu_top) of a hardware function operational description of a circuit. In this example, the bfu_top logic function occurs twice, and is therefore a candidate for the multistage, hybrid synthesis approach described herein. Note that "RECURSIVE_SYNTHESIS:TRUE" is an example of a parameter or attribute which indicates whether the logic function can be flattened (i.e., synthesized). In one example, a "TRUE" allows the synthesizing compiler to proceed, while a "FALSE" prevents the compiler from synthesizing. The attribute "BLOCK_TYPE" is an example of a parameter used to identify the logic function as having a corresponding library element or not. In this example, it is assumed that "unit" means that there is not a corresponding library element. As such, the desired attributes are met, and processing is allowed to proceed.

Note that if the attributes of bfu_top did not allow hybrid synthesis to proceed, then in this example, the top-level description would not include multiple instantiations of a common logic function type. As such, processing would descend into the next-level hierarchy 360 (FIG. 3) and repeat the evaluation process for each logic function in this level 320. In the example of FIG. 4, at this next level of hierarchy, the add_mac logic unit function, div_mac logic unit function, and mlu_mac logic unit function each occur multiple times. Thus, each is a candidate for the multistage, hybrid synthesis described herein. In evaluating the associated attributes, RECUSIVE_SYNTHESIS:TRUE and BLOCK_TYPE: rlm are each assumed to allow hybrid synthesis to proceed with respect to add_mac and div_mac logic functions. However, the "DENTRITE: FALSE" attribute is an example of a designation by which it has been pre-designated that this particular mlu_mac logic function is not to undergo hybrid synthesis as described herein. Note that this particular "DENDRITE" attribute is optional, and may be omitted if desired.

Upon the desired, predefined attributes being met for a particular logic function type, then physical synthesis on that logic function type is performed 340. Since this first synthesis is performed on only the logic function type(s) processing the desired attributes, it is a hybrid synthesis. Advantageously, this first synthesis on the logic function type(s) is allowed to proceed without restricting the resultant shape of the logic unit layout. Thus, in practice, an irregular-shaped logic unit layout is obtained for each logic function type. Next, a corresponding irregular-shaped blocking mask is created and placed corresponding to each instantiation of the irregular-shaped logic unit layout for each synthesized function type, and processing determines whether the first synthesis and irregular-shaped blocking mask creation and placement were successful 350. If "no", then processing descends to the next level of description hierarchy 360 and repeats the process for the logic functions of that level 320. Once hybrid synthesis and irregular-shaped blocking mask placement are successful, then a second synthesis on the (remaining) top-level description is performed 370. This second physical synthesis, also referred to herein as the final synthesis, is on the balance of the hardware function operation descriptions of the circuit outside of the multiple instantiations of the one or more logic function types having undergone first synthesis and resultant blocking mask placement. Note that the second synthesis proceeds with the embedded blocking mask(s) and logic function characterizing information described further below with reference to the more detailed example of FIGS. 5A-6B.

Upon completion of the second physical synthesis, routing and wiring for the integrated circuit design layout can be completed, which finishes the processing 380.

Figure 5A:
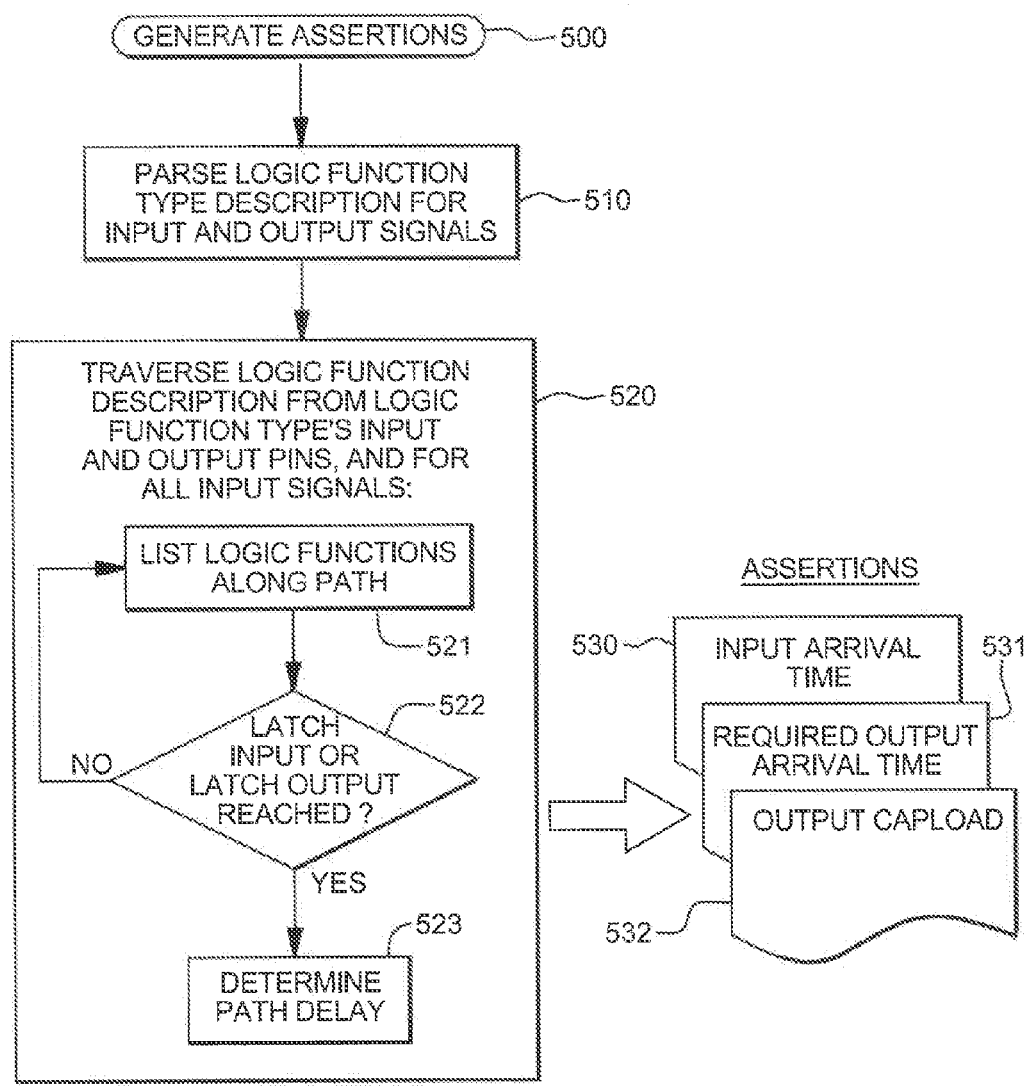
FIG. 5A depicts one embodiment of a process for generating assertions for a logical unit type of one or more logical unit types having multiple instantiations at a common level within the hardware function operation descriptions of the circuit, in accordance with an aspect of the present invention.

Commensurate with the first synthesis of one or more logic function types, the processing disclosed herein automatically generates assertions for each logic function type undergoing the first synthesis. In one embodiment, these assertions (e.g., timing signals) are generated without input of a designer. Referring to FIG. 5A, assertions are generated 500 by parsing the logic function description to identify input and output signals 510. Processing then forward traverses the logic description, beginning at the input pins, and backward traverses the logic description, beginning at the output pins, and for all input signals, lists logic functions along the logic path 521, and determines whether a next logic gate is a latch input or latch output 522. Once a latch input or latch output is identified, then the path delays are determined as required through the logic paths, and for example, subtracted from the latch input timing reference 523. In one embodiment, the output is an input arrival time 530, a required output arrival time 531 and an output capacitance load 532 for each input signal of the subject logic function type. Essentially, this process is identifying input and output pins of the logic function type to be generated, and corresponding timing properties for the logic function. By determining the number of logic, gates from an input pin to a latch input (or from a latch output to an output pin), the path delays through the logic path can be automatically ascertained by knowing that the logic gates employed (and latches employed) have known amounts of delay. Thus, timing signals for the logic function type propagating through the logic along a path from an input pin to a latch and from the latch to an output pin can be automatically ascertained.

Figure 5B:
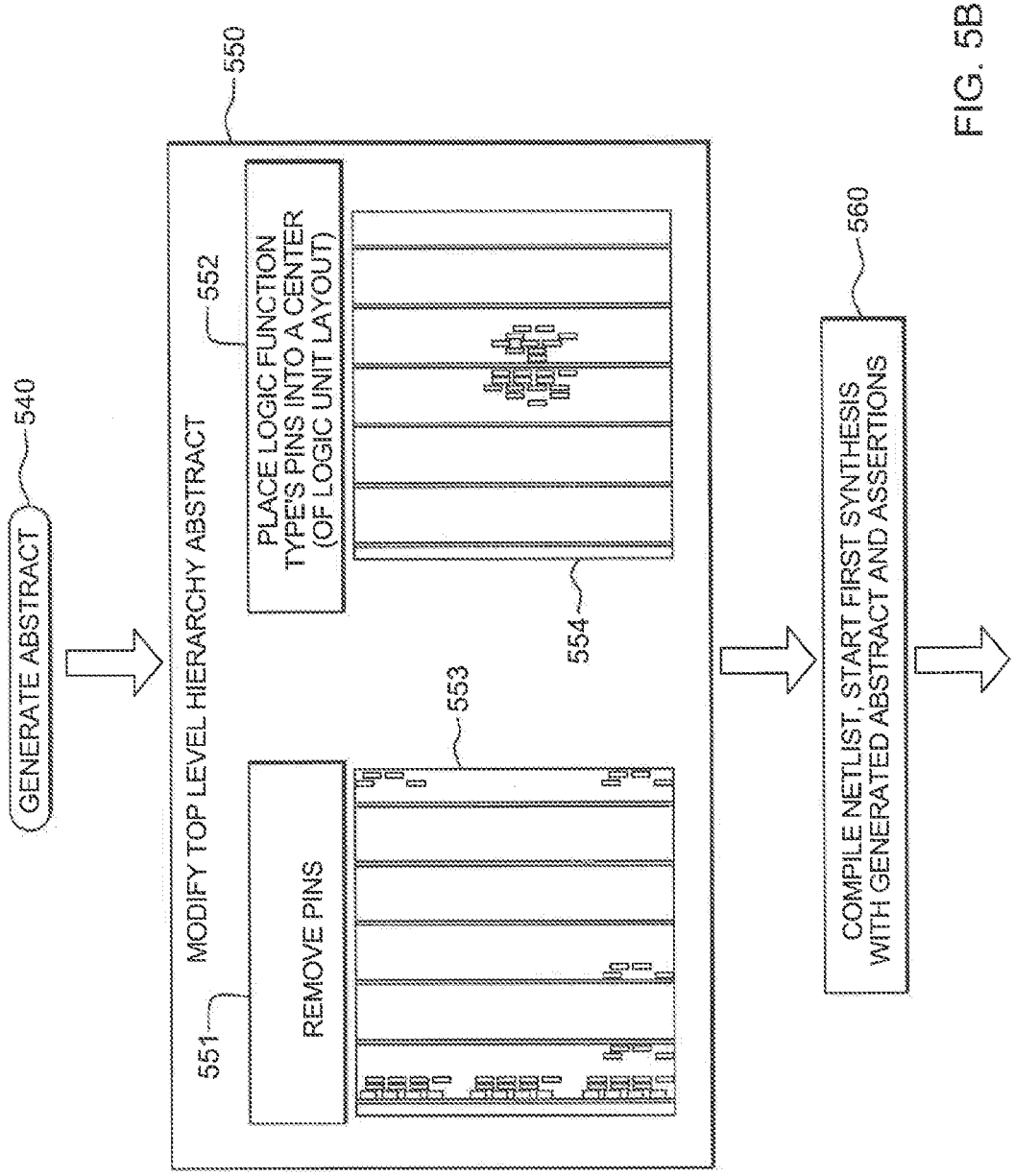
FIG. 5B depicts one embodiment of an abstract generation process for each logic unit type having multiple instantiations at a common level within the hardware function operation descriptions of the circuit, and initiating a first synthesis of the logic unit type(s) using a compiled netlist thereof, and the generated abstract and generated assertions, in accordance with an aspect of the present invention.

With reference to FIG. 5B, in addition to generating assertions, an abstract is automatically generated for each logic function type to undergo the hybrid synthesis 540. The abstract, which directs input and output pin placements for the logic function type, is obtained by modifying the top-level hierarchy abstract provided with the hardware function operation descriptions of the circuit in hardware description language 550 to remove all input and output pins 551 from the provided abstract layout 553, except for the input and output pins for the respective logic function type to be synthesized. These logic unit pins are located with a center of gravity 552 so as to be consolidated in a logic function type pin layout 554. After generating the abstract, a netlist is compiled for the logic function type, and the first synthesis can be started on the logic function type using the generated abstract and assertions 560.

Figure 5C:
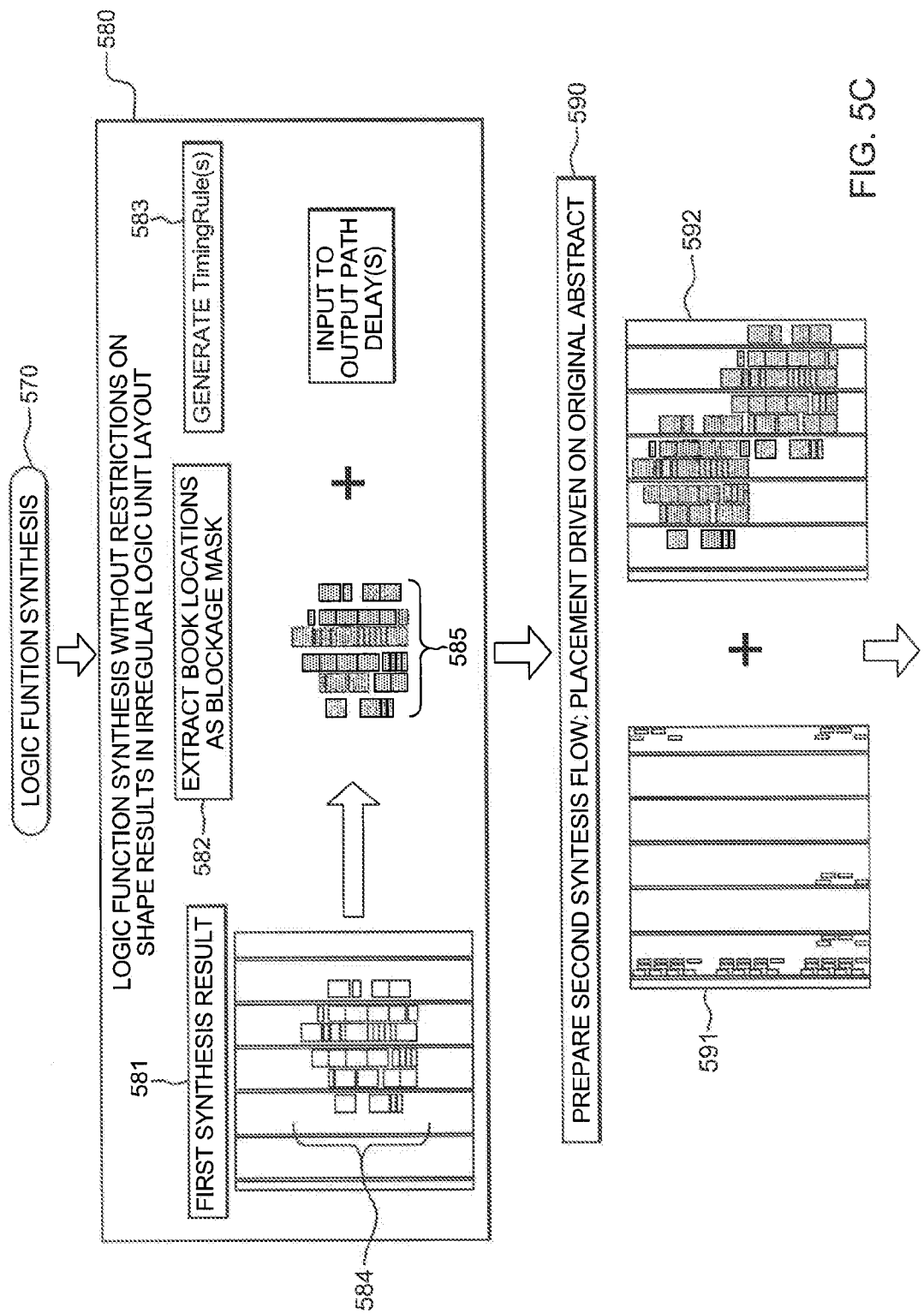
FIG. 5C depicts one embodiment of a process for performing the first synthesis on each logic unit type having multiple instantiations at a common level, and creating an irregular-shaped blocking mask(s) corresponding to a respective, resultant irregular-shaped logic unit layout(s), in accordance with an aspect of the present invention.

In FIG. 5C, the first (hybrid) synthesis for a given logic function type 570 is performed to produce a synthesis result 581 of an irregular-shaped logic unit layout 584. In accordance with an aspect of the present invention, this logic book placement and layout is not limited to a defined, regular resultant shape. The result is an irregular-shaped layout 584 such as illustrated in FIG. 5C. This layout is also referred to herein as a "dendrite" due to its irregular nature. Processing automatically extracts 582 from this layout (or dendrite) the book locations and creates an irregular-shaped blocking mask 585. This irregular-shaped blocking mask 585 is then used in combination with generated timing rules 583 of the input-to-output path delay(s) for the placed logic function and its input/output pins, in performing the second synthesis. The second (final) synthesis flow can then be prepared 590 using the original abstract layout 591 of the input/output pins for the top-level hardware function operation descriptions, as well as a partial circuit layout 592 created by placing each irregular-shaped blocking mask multiple times within the layout corresponding to the multiple instantiations of the respective logic function type. In this example, two instantiations of one logic function type are assumed, and thus, the irregular-shaped blocking mask 585 is repeated twice within the available circuit layout area.

Figure 6A:
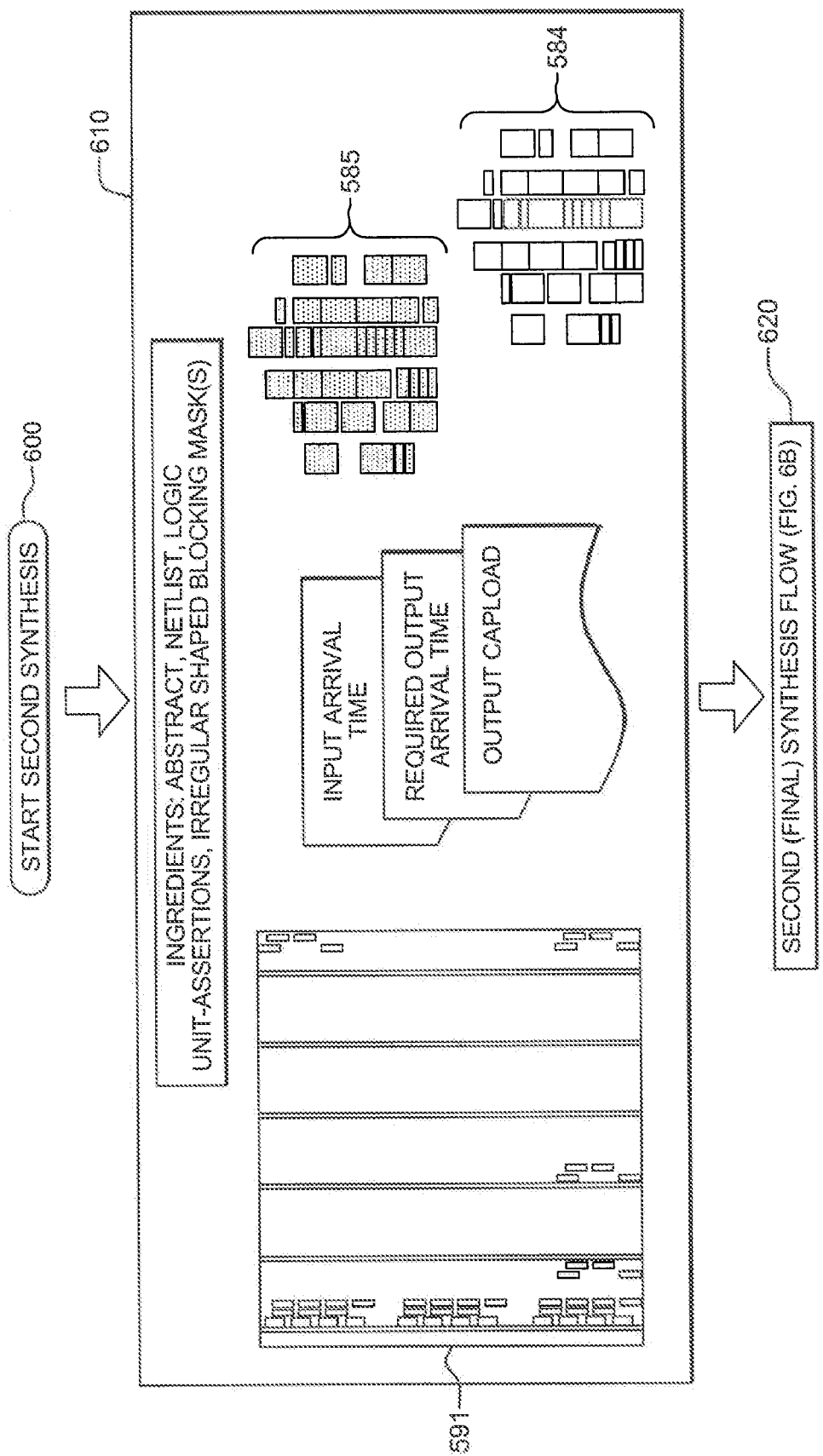
FIG. 6A depicts one embodiment of a process for performing, employing the partial circuit layout, a second synthesis on the hardware function operation descriptions of the circuit outside of the multiple instantiations of the one or more logic unit types to place cells about the irregular-shaped blocking masks, in accordance with an aspect of the present invention.

In FIG. 6A, the second synthesis is started on the balance of the hardware function operation descriptions of the circuit outside the multiple instantiations of the one or more logic function types, but with the blocking mask embedded 600. Ingredients to the second synthesis include the original abstract layout 591, the netlist, logic unit assertions, such as input arrival time, required output arrival time and output capacitance load, as well as the irregular-shaped blocking mask(s) 585 and each corresponding irregular-shaped logic unit layout 584. This second synthesis step seeks to place all the logic that is not part of the previously-placed dendrite, space for each of which has been reserved by the corresponding irregular-shaped blocking mask(s). The abstract denotes the available area, while the input arrival time, required output arrival time and output capacitance load are provided for the top-level hardware function operations. Note that the customization described herein is that there is a stepwise physical synthesis, and that during the first, hybrid synthesis, an irregular-shaped logic unit layout is allowed and obtained.

Figure 6B:
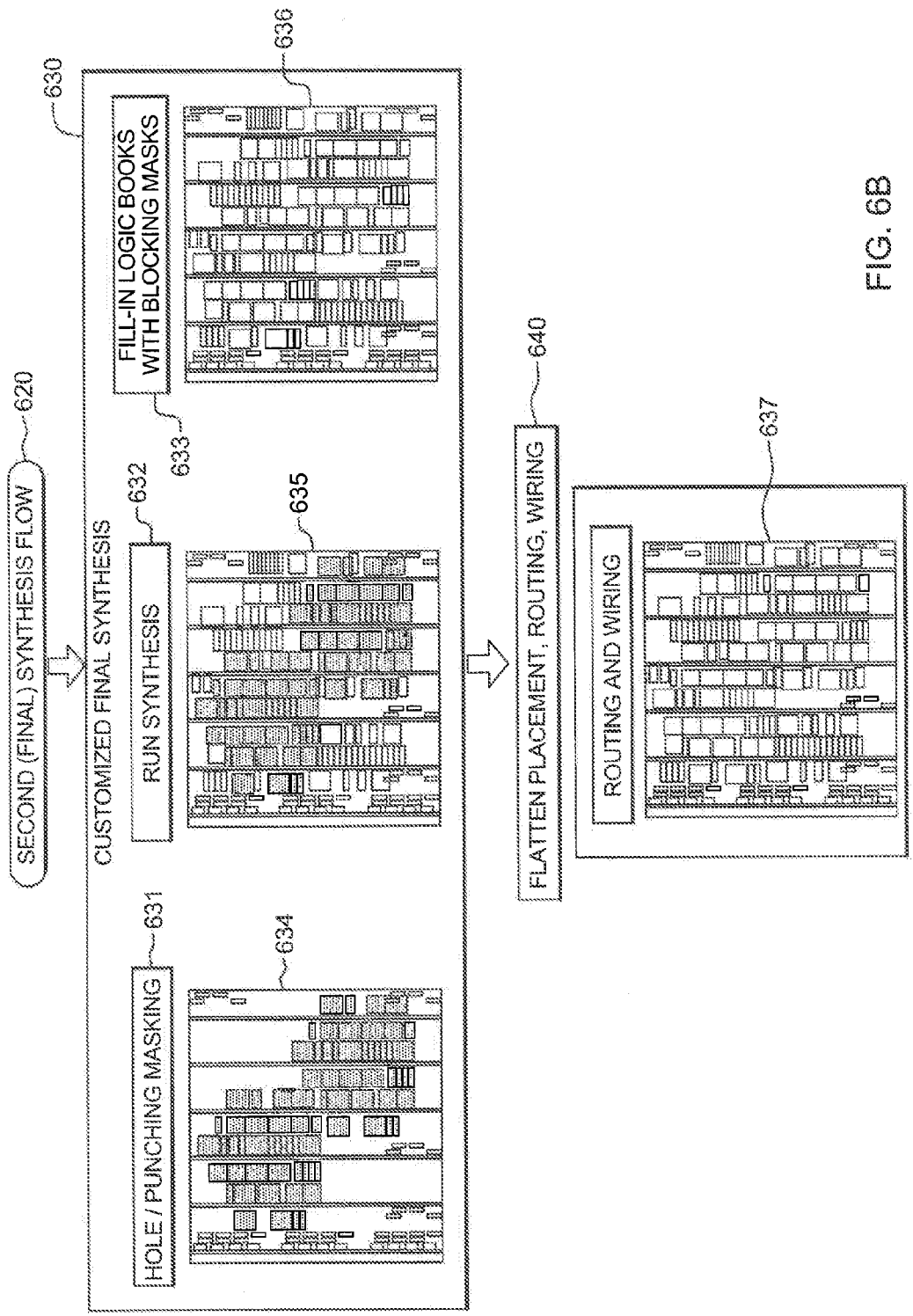
FIG. 6B depicts one embodiment of a process for completing the integrated circuit design by replacing or filling in the irregular-shaped blocking masks with the corresponding irregular-shaped logic unit layout(s), and performing final wiring based on the resultant logic placements in the physical circuit layout, in accordance with an aspect of the present invention.

In FIG. 6B, the second (final) synthesis flow 620 includes a customized final synthesis, wherein hole-punching/masking 631 is employed to produce a potential circuit layout 634. Note that the blocking masks designate areas where logic gates are not allowed during this second synthesis. However, in accordance with an aspect of the present invention, the blocking masks are porous so that individual logic gates may be inserted within the outer perimeter of the area defined by the blocking mask, if desired, during the second synthesis. After starting with the initial abstract of the top-level, and placing the blocking mask(s), the second synthesis is run 632 to place additional logic cells in the partial circuit layout 635. Thereafter, the corresponding logic unit (or books) are inserted into the circuit layout within (or in place of) the corresponding blocking mask(s) 633. The result is a flattened placement 636, and conventional routing and wiring 640 is performed to produce the final integrated circuit design layout 637.

Those skilled in the art will note from the above description, that the multistage, hybrid synthesis processing described herein provides automated pre-placement of synthesized sub-components, that is, irregular-shaped logic unit layouts (using the irregular-shaped blocking masks). In the final (large block) synthesis of the higher-level hierarchy, all empty spaces in the partial circuit layout may then be used for placement. This is followed by flat wiring of sub-components with the higher hierarchy levels. The benefit is a significantly reduced synthesis and tool runtime, more regularity, better ECO capabilities, and better control over the synthesis flow.

Note that in the hybrid synthesis approach described herein, there is no wiring, only book placement occurring at the first synthesis of the one or more logic function types identified as having multiple instances and meeting the predefined desired attributes, such as described above. Advantageously, the approach described herein allows for the detection of hierarchies in the hardware function operation descriptions of the circuit in hardware description language. Attributes in the design may be employed to identify logic blocks with respect to identical function, and with additional information according to symmetry. Synthesis flow is applied in a hierarchical order. Features of the approach include a first synthesis of a logic function (macro, sub-unit, etc) defining a resultant shape for the circuit layout.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable signal medium may include a propagated data signal with computer readable program code embodied therein, for example, in baseband or as part of a carrier wave. Such a propagated signal may take any of a variety of forms, including, but not limited to, electro-magnetic, optical or any suitable combination thereof. A computer readable signal medium may be any computer readable medium that is not a computer readable storage medium and that can communicate, propagate, or transport a program for use by or in connection with an instruction execution system, apparatus or device.

A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Figure 7:
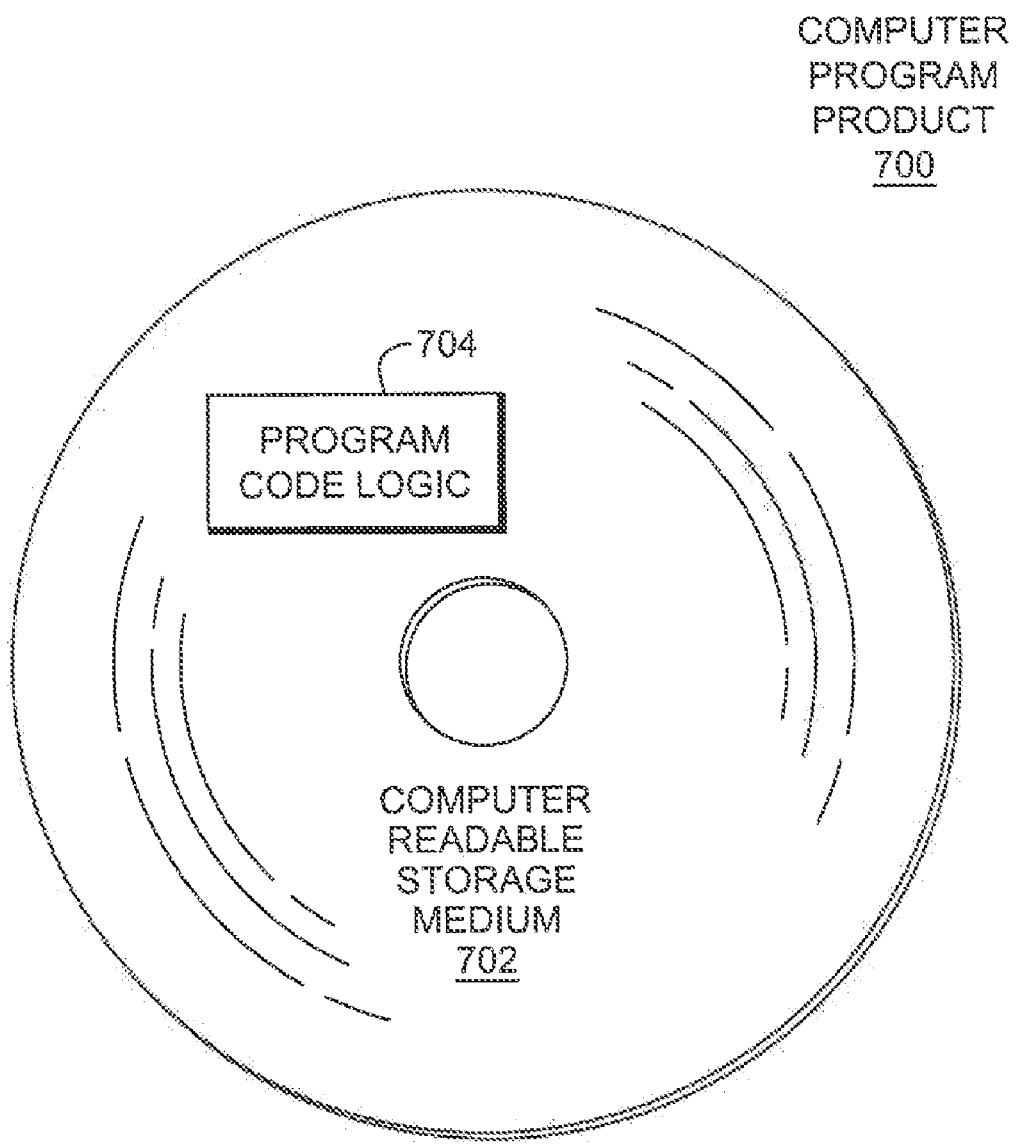
FIG. 7 depicts one embodiment of a computer program product incorporating one or more aspects of the present invention.

Referring now to FIG. 7, in one example, a computer program product 700 includes, for instance, one or more computer readable storage media 702 to store computer readable program code means or logic 704 thereon to provide and facilitate one or more aspects of the present invention.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language, such as Java, Smalltalk, C++ or the like, and conventional procedural programming languages, such as the "C" programming language, assembler or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block, diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the above, one or more aspects of the present invention may be provided, offered, deployed, managed, serviced, etc. by a service provider who offers management of customer environments. For instance, the service provider can create, maintain, support, etc. computer code and/or a computer infrastructure that performs one or more aspects of the present invention for one or more customers. In return, the service provider may receive payment from the customer under a subscription and/or fee agreement, as examples. Additionally or alternatively, the service provider may receive payment from the sale of advertising content to one or more third parties.

In one aspect of the present invention, an application may be deployed for performing one or more aspects of the present invention. As one example, the deploying of an application comprises providing computer infrastructure operable to perform one or more aspects of the present invention.

As a further aspect of the present invention, a computing infrastructure may be deployed comprising integrating computer readable code into a computing system, in which the code in combination with the computing system is capable of performing one or more aspects of the present invention.

As yet a further aspect of the present invention, a process for integrating computing infrastructure comprising integrating computer readable code into a computer system may be provided. The computer system comprises a computer readable medium, in which the computer medium comprises one or more aspects of the present invention. The code in combination with the computer system is capable of performing one or more aspects of the present invention.

Although various embodiments are described above, these are only examples. For example, computing environments of other architectures can incorporate and use one or more aspects of the present invention. Additionally, the network of nodes can include additional nodes, and the nodes can be the same or different from those described herein. Also, many types of communications interfaces may be used. Further, other types of programs and/or other optimization programs may benefit from one or more aspects of the present invention, and other resource assignment tasks may be represented. Resource assignment tasks include the assignment of physical resources. Moreover, although in one example, the partitioning minimizes communication costs and convergence time, in other embodiments, the cost and/or convergence time may be otherwise reduced, lessened, or decreased.

Further, other types of computing environments can benefit from one or more aspects of the present invention. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiment with various modifications as are suited to the particular use contemplated.

What is claimed is:

1. A method of facilitating placement of logic cells in an integrated circuit design layout, comprising:

parsing hardware function operation descriptions of a circuit in hardware description language to identify multiple instantiations of at least one type of logic function, each logic function type of the at least one logic function type to be implemented by a plurality of logic cells;

performing by one or more processors, without shape restriction, a first synthesis on each logic function type of the at least one logic function type to produce therefrom an irregular-shaped logic unit layout comprising a plurality of logic cells;

establishing at least one irregular-shaped blocking mask, each irregular-shaped blocking mask corresponding to a respective irregular-shaped logic unit layout produced by the first synthesis of each logic function type of the at least one logic function type;

creating a partial circuit layout by placing each irregular-shaped blocking mask multiple times therein corresponding to the multiple instantiations of the respective logic function type of the at least one logic function type; and performing by the one or more processors, employing the partial circuit layout, a second synthesis on the balance of the hardware function operation descriptions of the circuit outside of the multiple instantiations of the at least one logic function type to place logic cells in the partial circuit layout about the irregular-shaped blocking masks, wherein the irregular-shaped blocking masks facilitate producing the integrated circuit design layout.

2. The method of claim 1, wherein establishing the irregular-shaped blocking mask for each irregular-shaped logic unit layout produced by the first synthesis of each logic function type of the at least one logic function type comprises establishing the irregular-shaped blocking mask to be porous to the placement of a logic cell of the circuit outside the corresponding logic function within a perimeter of the irregular-shaped blocking mask during performing the second synthesis on the balance of the hardware function operation descriptions of the circuit.

3. The method of claim 1, further comprising, subsequent to performing the second synthesis on the balance of the hardware function operation descriptions of the circuit, replacing each irregular-shaped blocking mask with the respective irregular-shaped logic unit layout to produce a physical circuit layout and performing, routing and wiring for the physical circuit layout to produce the integrated circuit design layout.

4. The method of claim 1, wherein the parsing comprises proceeding from a top level description of the hardware function operations of the circuit in hardware description language to attempt to identify multiple instances of at least one logic function type, and failing to identify in the top level description multiple instances of at least one logic function type, descending to a next hierarchical level description and proceeding to parse the next hierarchical level description to identify the multiple instances of at least one logic function type therein.

5. The method of claim 1, wherein performing the first synthesis on each logic function type results in at least two symmetrical irregular-shaped logic unit layouts of a logic function type of the at least one logic function type.

6. The method of claim 1, wherein performing the first synthesis on each logic function type of the at least one logic function type proceeds responsive to determining that the subject logic function type is other than a predefined library element.

7. The method of claim 1, wherein performing the first synthesis on each logic function type of the at least one logic function type further comprises generating assertions comprising input arrival times, required output arrival times, and output pin capacitance loadings for the resultant irregular-shaped logic unit layout, and generating an abstract to condense input and output pins for the irregular-shaped logic unit layout.

8. The method of claim 7, wherein establishing the irregular-shaped blocking mask for each irregular-shaped logic unit layout produced by the first synthesis of each logic function type of the at least one logic function type comprises establishing the irregular-shaped blocking mask to be porous to the placement of a logic cell of the circuit outside of the corresponding logic function within a perimeter of the irregular-shaped blocking mask during performing the second synthesis on the balance of the hardware function operation descriptions of the circuit, and wherein the method further comprises:

placing, during performing the second synthesis, at least one logic cell of the circuit outside the corresponding logic function within the perimeter of the irregular-shaped blocking mask; and subsequent to performing the second synthesis on the balance of the hardware function operation descriptions of the circuit, replacing each irregular-shaped blocking mask with the corresponding irregular-shaped logic unit layout to produce a physical circuit layout and performing routing and wiring for the physical circuit layout to produce the integrated circuit design layout.

9. A computer system for facilitating placement of logic cells in an integrated circuit design layout, the computer system comprising:

a memory; and a processor in communications with the memory, wherein the computer system is configured to perform a method, the method comprising:

parsing hardware function operation descriptions of a circuit in hardware description language to identify multiple instantiations of at least one type of logic function, each logic function type of the at least one logic function type to be implemented by a plurality of logic cells;

performing, without shape restriction, a first synthesis on each logic function type of the at least one logic function type to produce therefrom an irregular-shaped logic unit layout comprising a plurality of logic cells;

establishing at least one irregular-shaped blocking mask, each irregular-shaped blocking mask corresponding to a respective irregular-shaped logic unit layout produced by the first synthesis of each logic function type of the at least one logic function type;

creating a partial circuit layout by placing each irregular-shaped blocking mask multiple times therein corresponding to the multiple instantiations of the respective logic function type of the at least one logic function type; and performing, employing the partial circuit layout, a second synthesis on the balance of the hardware function operation descriptions of the circuit outside of the multiple instantiations of the at least one logic function type to place logic cells in the partial circuit layout about the irregular-shaped blocking masks, wherein the irregular-shaped blocking masks facilitate producing the integrated circuit design layout.

10. The computer system of claim 9, wherein establishing the irregular-shaped blocking mask for each irregular-shaped logic unit layout produced by the first synthesis of each logic function type of the at least one logic function type comprises establishing the irregular-shaped blocking mask to be porous to the placement of a logic cell of the circuit outside the corresponding logic function within a perimeter of the irregular-shaped blocking mask during performing the second synthesis on the balance of the hardware function operation descriptions of the circuit.

11. The computer system of claim 9, further comprising, subsequent to performing the second synthesis on the balance of the hardware function operation descriptions of the circuit, replacing each irregular-shaped blocking mask with the respective irregular-shaped logic unit layout to produce a physical circuit layout and perforating routing and wiring for the physical circuit layout to produce the integrated circuit design layout.

12. The computer system of claim 9, wherein the parsing comprises proceeding from a top level description of the hardware function operations of the circuit in hardware description language to attempt to identify multiple instances of at least one logic function type, and failing to identify in the top level description multiple instances of at least one logic function type, descending to a next hierarchical level description and proceeding to parse the next hierarchical level description to identify the multiple instances of at least one logic function type therein.

13. The computer system of claim 9, wherein performing the first synthesis on each logic function type results in at least two symmetrical irregular-shaped logic unit layouts of a logic function type of the at least one logic function type.

14. The computer system of claim 9, wherein performing the first synthesis on each logic function type of the at least one logic function type proceeds responsive to determining that the subject logic function type is other than a predefined library element.

15. The computer system of claim 9, wherein performing the first synthesis on each logic function type of the at least one logic function type further comprises generating assertions comprising input arrival times, required output arrival times, and output pin capacitance loadings for the resultant irregular-shaped logic unit layout, and generating an abstract to condense input and output pins for the irregular-shaped logic unit layout.

16. The computer of claim 15, wherein establishing the irregular-shaped blocking mask for each irregular-shaped logic unit layout produced by the first synthesis of each logic function type of the at least one logic function type comprises establishing the irregular-shaped blocking mask to be porous to the placement of a logic cell of the circuit outside of the corresponding logic function within a perimeter of the irregular-shaped blocking mask during performing the second synthesis on the balance of the hardware function operation descriptions of the circuit, and wherein the method further comprises:

placing, during performing the second synthesis, at least one logic cell of the circuit outside the corresponding logic function within the perimeter of the irregular-shaped blocking mask; and subsequent to performing the second synthesis on the balance of the hardware function operation descriptions of the circuit, replacing each irregular-shaped blocking mask with the corresponding irregular-shaped logic unit layout to produce a physical circuit layout and performing routing and wiring for the physical circuit layout to produce the integrated circuit design layout.

17. A computer program product for facilitating placement of logic cells in an integrated circuit design layout, the computer program product comprising:

a non-transitory, computer-readable storage medium readable by a processor and storing executable instructions for execution by the processor for performing a method comprising:

parsing hardware function operation descriptions of a circuit in hardware description language to identify multiple instantiations of at least one type of logic function, each logic function type of the at least one logic function type to be implemented by a plurality of logic, cells;

performing, without shape restriction, a first synthesis on each logic function type of the at least one logic function type to produce therefrom an irregular-shaped logic unit layout comprising a plurality of logic cells;

establishing at least one irregular-shaped blocking mask, each irregular-shaped blocking mask corresponding to a respective irregular-shaped logic unit layout produced by the first synthesis of each logic function type of the at least one logic function type;

creating a partial circuit layout by placing each irregular shaped blocking mask multiple times therein corresponding to the multiple instantiations of the respective logic function type of the at least one logic function type; and performing, employing the partial circuit layout, a second synthesis on the balance of the hardware function operation descriptions of the circuit outside of the multiple instantiations of the at least one logic function type to place logic cells in the partial circuit layout about the irregular-shaped blocking masks, wherein the irregular-shaped blocking masks facilitate producing the integrated circuit design layout.

18. The computer program product of claim 17, wherein establishing the irregular-shaped blocking mask for each irregular-shaped logic unit layout produced by the first synthesis of each logic function type of the at least one logic function type comprises establishing the irregular-shaped blocking mask to be porous to the placement of a logic cell of the circuit outside the corresponding logic function within a perimeter of the irregular-shaped blocking mask during performing the second synthesis on the balance of the hardware function operation descriptions of the circuit.

19. The computer program product of claim 17, further comprising, subsequent to performing the second synthesis on the balance of the hardware function operation descriptions of the circuit, replacing each irregular-shaped blocking mask with the respective irregular-shaped logic unit layout to produce a physical circuit layout and performing routing and wiring for the physical circuit layout to produce the integrated circuit design layout.

20. The computer program product of claim 17, wherein the parsing comprises proceeding from a top level description of the hardware function operations of the circuit in hardware description language to attempt to identify multiple instances of at least one logic function type, and failing to identify in the top level description multiple instances of at least one logic function type, descending to a next hierarchical level description and proceeding to parse the next hierarchical level description to identify the multiple instances of at least one logic function type therein.

\* \* \* \* \*

UNITED STATES PATENT AND TRADEMARK OFFICE
CERTIFICATE OF CORRECTION

PATENT NO. : 8,316,335 B2
APPLICATION NO. : 12/963677
DATED : November 20, 2012
INVENTOR(S) : Harry Barowski et al.

Page 1 of 1

It is certified that error appears in the above-identified patent and that said Letters Patent is hereby corrected as shown below:

On The Title Page,

In the Inventors Item (75): Delete "Harold Mielich, Stuttgart (DE)" and insert --Harald Mielich, Stuttgart (DE)--.

Signed and Sealed this
Twelfth Day of May, 2015

Michelle K. Lee
*Director of the United States Patent and Trademark Office*